UNITED STATES PATENT OFFICE.

JOSÉ DE LAS FUENTES, OF MEXICO, MEXICO.

PROCESS FOR TREATING NATURAL SODA.

1,308,899.      Specification of Letters Patent.      Patented July 8, 1919.

No Drawing.      Application filed January 9, 1919. Serial No. 270,415.

*To all whom it may concern:*

Be it known that I, José DE LAS FUENTES, chemist, a citizen of the United States of Mexico, residing in Mexico, D. F., in the United States of Mexico, have invented a new and useful Improvement in Processes for Treating Natural Soda, of which the following is a specification.

The object of my invention is giving the industry a new and useful method for separating the carbonate and sesquicarbonate of sodium from the other salts with which it is mixed in natural soda (natron, tequosquite, urao, etc.)

To achieve my object the natural sodas, preferably calcinated, instead of being lixiviated with fresh water, are lixiviated with a solution that contains the other salts found in natural soda, that is to say with a solution saturated with sodium chlorid and sulfate, etc. This solution is obtained in practice by the use of the mother waters of a previous operation. The solution of natural soda and mother waters is treated by carbon dioxid, which changes the carbonate and sesquicarbonate contained in natural soda into bicarbonate which is precipitated. The lixiviation with a solution saturated principally with sodium chlorid or sulfate is the essential step in my process, as bicarbonate is nearly insoluble in the aforesaid solution, all which is of great interest for industry, because the carbonate may be separated getting it nearly complete in the form of bicarbonate without evaporation and consequently with the minimum cost of fuel. This precipitate, by calcination, is transformed into sodium carbonte (soda ash) and free dioxid of carbon the latter being used in a second operation.

For the practical carrying out of this process all the usual apparatus of lixiviation, carbonatation and filtration well known to experts can be used.

Theoretically the amount of carbon dioxid that has to be used to treat the natural soda solution is equal to that given away by the calcination of the bicarbonate but the unavoidable loss can be replaced with chimney gas or some other source of carbon dioxid, *e. g.:* the calcination of calcium carbonate.

Having thus described the process, what I claim as my invention is the following:

The process for separating the carbonates and sesquicarbonates found in natural soda from the other salts that accompany them, which essentially consists in lixiviating natural soda with mother waters from a previous operation instead of fresh water and submitting the resulting solution to the action of dioxid of carbon changing the carbonates and sesquicarbonates into bicarbonate which is precipitated all substantially as described.

JOSÉ DE LAS FUENTES.

Witnesses:
    E. LUQUES,
    R. BETISE QUINLAND.